United States Patent
Taylor et al.

(10) Patent No.: US 9,558,232 B1
(45) Date of Patent: Jan. 31, 2017

(54) DATA MOVEMENT BULK COPY OPERATION

(71) Applicant: EMC Corporation, Hopkinton, MA (US)

(72) Inventors: Alan L. Taylor, Cary, NC (US); James M. Holt, Raleigh, NC (US); Robert F. Goudreau, Cary, NC (US); Karl M. Owen, Chapel Hill, NC (US); Chung-Huy Chen, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 636 days.

(21) Appl. No.: 13/923,563

(22) Filed: Jun. 21, 2013

(51) Int. Cl.
*G06F 7/00* (2006.01)
*G06F 17/30* (2006.01)
*G06F 3/06* (2006.01)

(52) U.S. Cl.
CPC ........ *G06F 17/30371* (2013.01); *G06F 3/061* (2013.01)

(58) Field of Classification Search
CPC .......................... G06F 3/061; G06F 17/30371
See application file for complete search history.

(56) References Cited

U.S. PATENT DOCUMENTS

| | | | | |
|---|---|---|---|---|
| 6,226,650 B1 * | 5/2001 | Mahajan | ........... | G06F 17/30575 379/93.12 |
| 6,226,687 B1 * | 5/2001 | Harriman | ................ | H04L 12/56 370/394 |
| 6,564,229 B1 * | 5/2003 | Baweja | ............. | G06F 17/30067 707/741 |
| 2008/0155218 A1 * | 6/2008 | Elliott | ................. | G06F 11/1658 711/165 |
| 2012/0079583 A1 * | 3/2012 | Christiansen | ........... | G06F 3/061 726/9 |

OTHER PUBLICATIONS

Microsoft, "Offloaded data transfers," Windows, http://microsoft.com/en-us/library/windows/desktop/hh848056%28v=vs.85%29.aspx, 2 Pages, Nov. 28, 2012.
Microsoft, "POPULATE_TOKEN_HEADER structure," Windows Drivers, http://msdn.microsoft.com/en-us/library/windows/hardware/hh967730%28v=vs.85%29.aspx, 2 Pages, May 17, 2013.
Microsoft, "WRITE_USING_TOKEN_HEADER structure," Windows Drivers, http://msdn.microsoft.com/en-us/library/windows/hardware/hh967746%28v=vs.85%29.aspx, 2 Pages, May 17, 2013.

* cited by examiner

*Primary Examiner* — Charles Lu
(74) *Attorney, Agent, or Firm* — Muirhead and Saturnelli, LLC

(57) ABSTRACT

Techniques are described for performing a copy operation. A first request is received to perform a copy operation. The first request includes a set of parameters in accordance with a defined interface and include a source area and a target area. The source area includes source ranges and source devices. Each of the source ranges identifies a portion of a logical address range of a different one of the source devices. The target area includes target ranges and target devices. Each of the target ranges identifies a portion of a logical address range of a different one of the target devices. The first request is partitioned in to a plurality of other requests each of which is a request to copy a portion of source data located in the source area to a corresponding location in the target area. The other requests are then issued.

20 Claims, 10 Drawing Sheets

FIG. 10

| State variables 1110 | Start | 1120b | 1120c | 1120d | 1120e | 1120f | 1120g | 1120h | 1120i | 1120j | 1120k |
|---|---|---|---|---|---|---|---|---|---|---|---|
| in order sequence number 1102 | 1 | 3 | 5 | 2 | 1 | 4 | 7 | 6 | 8 | 9 | 10 |
| in order bytes complete 1104 | 0 | 1 | 1 | 1 | 2 | 6 | 6 | 7 | 9 | 10 | 10 |
| out of order bytes complete 1106 | 0 | 0 | 2 | 3 | 3 | 5 | 5 | 6 | 8 | 9 | 10 |
| MAX out of order sequence number 1108 | 0 | 3 | 5 | 5 | 5 | 0 | 1 | 1 | 0 | 0 | 0 |

Order in which outstanding requests and associated sequence numbers complete 1120

Values after outstanding request completions 1130

DATA MOVEMENT BULK COPY OPERATION

BACKGROUND

Technical Field

This application generally relates to data storage, and more particularly to techniques used in connection with determining and performing data movements in a multi-tiered storage environment.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives, and disk interface units. Such storage systems are provided, for example, by EMC Corporation of Hopkinton, Mass. The host systems access the storage system through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units, logical devices, or logical volumes (LVs). The logical disk units may or may not correspond to the actual disk drives. Allowing multiple host systems to access the storage system allows the host systems to share data stored therein.

In connection with data storage, a host may issue I/O operations to copy data from a source location on a source device to a target location on a target device. The source and target devices may be on the same or different data storage systems. To perform the operation, the host may issue a read command to read the data to be copied from the source location of the source device from a source data storage system. In response, the source data storage system may send the requested data across a network connection to the host. The host may then issue a write command to a target data storage system including the target device. For the write operation, the host transmits the data to the target data storage system whereby the target data storage system writes the data to the target location of the target device.

SUMMARY OF THE INVENTION

In accordance with one aspect of the invention is a method of performing a copy operation comprising: receiving a first request to perform a copy operation, the first request including a set of one or more parameters in accordance with a defined interface, the one or more parameters including a source area and a target area, wherein the source area includes one or more source ranges and one or more source devices, wherein each source range identifies a portion of a logical address range of a different one of the one or more source devices, wherein the target area includes one or more target ranges and one or more target devices, wherein each target range identifies a portion of a logical address range of a different one of the one or more target devices; partitioning the first request into a plurality of other requests whereby each of the plurality of other requests is a request to copy a portion of source data located in the source area to a corresponding location in the target area; and issuing the plurality of other requests to copy the source data from the source area to the target area. The one or more source ranges of the source area may include a plurality of source ranges, the one or more source devices may include a plurality of source devices, a first of the plurality of source ranges may be located on a first of the plurality of source devices and a second of the plurality of source ranges may be located on a second of the plurality of source devices different from the first source device. The one or more target ranges of the target area may include a plurality of target ranges, the one or more target devices may include a plurality of target devices, a first of the plurality of target ranges may be located on a first of the plurality of target devices and a second of the plurality of target ranges may be located on a second of the plurality of target devices different from the first target device. A first number of source ranges specified by the plurality of source ranges of the source area may be different than a second number of target ranges specified by the plurality of target ranges of the target area. Each of the plurality of source ranges and each of the plurality of target ranges may specify a logical block address range and at least a first of the plurality of source ranges may specify a first logical block address range that is different from a second of the plurality of source ranges and wherein the first logical block address range of the first source range may also be different than a second logical block address range of a first of the plurality of target ranges. The one or more parameters may include an offset denoting an offset within the source area from which to commence copying data for the copy operation of the first request. Processing for at least some of the other requests each copying a portion of the source data from the source area to the target area may be performed in parallel. A sequence number may be assigned to each of the plurality of other requests prior to said issuing to uniquely identify said each other request. The plurality of other requests are issued in a first order in accordance with an ordering of sequence numbers assigned to the plurality of requests and at least a first of the other requests completes out of order with respect to said ordering of sequence numbers. A first amount of the source data may represent a contiguous amount of the source data at a point in time that has been copied from the source area to the target area in accordance with a logical representation of the source area as a concatenation of said one or more source ranges. The first amount may include all data portions of the logical representation located within a logically contiguous region of the logical representation of the source area, the logically contiguous region beginning with a starting location in the source area and ending at a second location in the source area, the starting location denoting an initial location in the source area from which copying commences for the copy operation. The first amount may be reported as an amount of the source data copied to the target area at the point in time. The starting location may be determined in accordance with the offset. If the copy operation terminates prior to copying all the source data from the source area to the target area, the copy operation may subsequently resume copying a remaining portion of the source data logically located in the source area following the logically contiguous region. A token may represent the source area comprising the one or more source ranges and the one or more source devices, and the method may further comprise sending a command request from a client to a data storage system, said command request including said token and other information identifying said target area and said offset; and responsive to receiving the command request at the data storage system, performing processing to translate the command request to the first request. The token may be obtained by the client. The token may be obtained by another component other than the client and then provided by the other component to the client. Each of the plurality of other requests may copy a different portion of the source data that is a first size, the first size being determined in accordance with said offset, the one or more source ranges, and the one or more target ranges. Each of the plurality of other requests may copy a different portion of the source data whereby the different portion may be included in the source area and may not span across a boundary of any of the one or more source ranges. The different portion may be copied to a corresponding location in the target area that does not span across a boundary of any of the one or more target ranges. The defined interface may be an application programming interface and the first request may be a call to invoke execution of code on a data storage system. The call may be made using the defined interface, and wherein each of the one or more source ranges may be expressed using a starting location on one of the one or more source devices and a length. Each of the one or more target ranges may be expressed using a starting location on one of the one or more target devices and a length.

In accordance with another aspect of the invention is a computer readable medium comprising code stored thereon for performing a copy operation, the computer readable medium comprising code stored thereon for: receiving a first request to perform a copy operation, said first request including a set of one or more parameters in accordance with a defined interface, said one or more parameters including a source area and a target area, wherein said source area includes one or more source ranges and one or more source devices, wherein each of said one or more source ranges identifies a portion of a logical address range of a different one of the one or more source devices, wherein said target area includes one or more target ranges and one or more target devices, wherein each of said one or more target ranges identifies a portion of a logical address range of a different one of the one or more target devices; partitioning the first request into a plurality of other requests whereby each of the plurality of other requests is a request to copy a portion of source data located in the source area to a corresponding location in the target area; and issuing the plurality of other requests to copy the source data from the source area to the target area.

In accordance with another aspect of the invention is a system comprising: a host including first code stored in a first memory, wherein said first code, when executed, issues a first request to a data storage system to perform a copy operation, said first request including a first set of one or more parameters identifying a source area and a target area for the copy operation; and said data storage system including second code stored in a second memory, wherein, said second code, when executed performs processing comprising: receives the first request from the host; translates the first request and associated first set of one or more parameters into a second request and associated second set of one or more parameters to perform the copy operation, wherein said second set of one or more parameters is in accordance with a defined interface, said one or more parameters of the second set identifying the source area and the target area, wherein said source area includes one or more source ranges and one or more source devices, wherein each of said one or more source ranges identifies a portion of a logical address range of a different one of the one or more source devices, wherein said target area includes one or more target ranges and one or more target devices, wherein each of said one or more target ranges identifies a portion of a logical address range of a different one of the one or more target devices; partitioning the second request into a plurality of other requests whereby each of the plurality of other requests is a request to copy a portion of source data located in the source area to a corresponding location in the target area; and issuing the plurality of other requests to copy the source data from the source area to the target area.

BRIEF DESCRIPTION OF THE DRAWINGS

Features and advantages of the present invention will become more apparent from the following detailed description of exemplary embodiments thereof taken in conjunction with the accompanying drawings in which:

FIGS. 3, 4, 5, 6 and 10 are examples illustrating use of techniques in an embodiment herein.

DETAILED DESCRIPTION OF EMBODIMENT(S)

Figure 1:
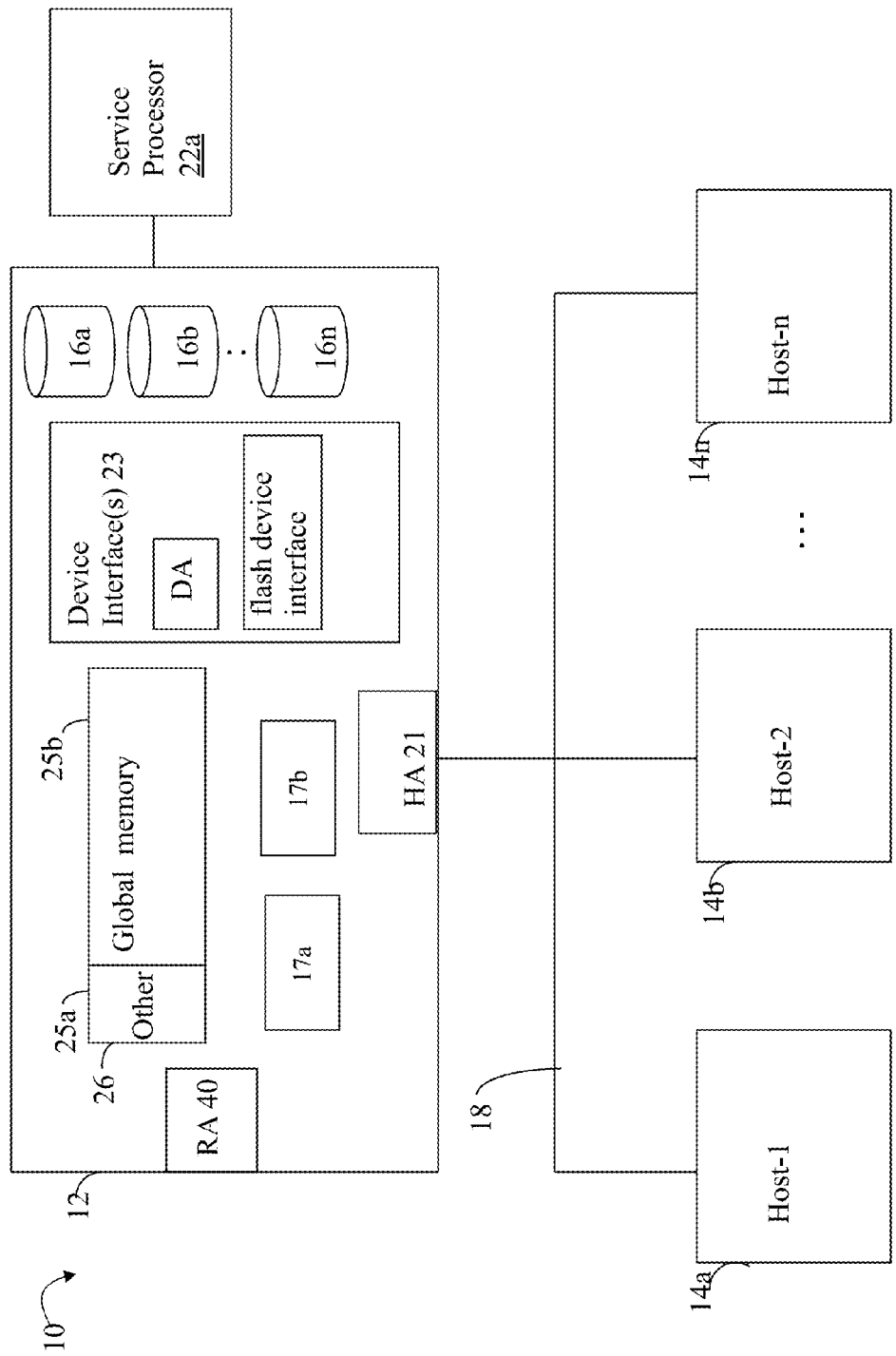
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intelbased processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system may be a single unitary data storage system, such as single data storage array, including two main storage processors or computer processing units (CPUs). Techniques herein may be more generally use in connection with any one or more data storage system each including a different number of main processors than as illustrated herein. The data storage system 12 may be a data storage array, such as a VNX™ data storage array by EMC Corporation of Hopkinton, Mass., including a plurality of data storage devices 13a-13n and two main storage processors or CPUs 17a, 17b. The processors 17a, 17b may be CPUs included in the data storage system for processing requests and commands. In connection with performing techniques herein, an embodiment of the data storage system may include multiple service processors including more than two main CPUs as described. The VNX™ data storage system mentioned above may include two processors 17a, 17b for performing processing in connection with servicing requests. Additionally, the two processors 17a, 17b may be used in connection with failover processing when communicating with the management system 16. More generally, a data storage system may include one or more such main CPUs such as 17a, 17b.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, volumes, or logical units (LUNs). The LUNs may or may not correspond to the actual physical devices or drives 16a-16n. For example, one or more LUNs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

The device interface, such as a DA, performs I/O operations on a drive 16a-16n. In the following description, data residing on an LUN may be accessed by the device interface following a data request in connection with I/O operations that other directors originate. Data may be accessed by LUN in which a single device interface manages data requests in connection with the different one or more LUNs that may reside on a drive 16a-16n.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

With reference to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

In connection with a data storage system, one operation that may be performed is to copy data from a source area to a target area whereby both of the foregoing may be included in the same data storage system. Generally, the source area may comprise one or more source ranges each corresponding to a possibly different LBA (logical block address) range of a source device (e.g., LUN). In a similar manner, the target area may comprise one or more target ranges each corresponding to a possibly different LBA range of a target device (e.g., LUN). As will be described in more detail herein, each of the source ranges may be on the same or a different source device than other source ranges, and each of the target ranges may be on the same or a different target device than other target ranges. Furthermore, the copy operation may result from an originating request within the data storage system (e.g., data storage system internally generated the copy operation) as well as external from the data storage system (e.g., issued by an external client such as a host). In description herein, the copy operation may also be referred to as a bulk copy operation due to the data portions copied from possibly many disparate different source logical address locations of source devices (e.g., the source area) to possibly many disparate different target logical address locations of target devices (e.g., the target area). In one embodiment, each source range for a particular source device may be expressed using a starting offset and length whereby starting offset denotes the starting offset of the source range on the particular source device and the length denotes the size or span of the source range. Each source range (expressed using a starting offset and length) and associated source device may be specified as a triple or set of location information including the source device, starting offset and length. In a similar manner, each target range (expressed using a starting offset and length) and associated target device may be specified as a triple or set of location information. In an embodiment in accordance with techniques herein, the size of the data portion identified by each such triple or set of location information may differ. However, the total length or size represented by all triples of the source area may match the total length of size represented by all triples of the target area. Alternatively, an embodiment may not require the total length or size of the source area to match the total length or size of the target area and may perform additional processing in the case when the foregoing lengths do not match. For example, if the target area is smaller than the source area, an embodiment may reiterate or repeat usage of the source area data as needed to fill the target area. The foregoing and other details regarding the bulk copy operation in an embodiment in accordance with techniques herein are described in following paragraphs.

As a first example, consider a request to perform a bulk copy operation originating from a client, such as a host, that is external with respect to the data storage system whereby the source and target areas of the copy operation are included in the same data storage system.

In this example, the host may want to copy data from a source area to a target area. As noted elsewhere herein, the source area (including the source data to be copied) may include one or more source ranges. Each source range itself may specify a contiguous logical address range of a source device. However, each source range with respect to another source range may not be so contiguously located on the same source device. In a similar manner, the target area may be expressed as one or more target ranges. Each target range itself may specify a contiguous logical address range of a target device. However, each target range with respect to another target range may not be so contiguously located on the same target device. Furthermore, each of the foregoing source and target ranges may possibly be located on different devices (e.g., different LUN) in the data storage system.

What will be described is use of a token-based exchange of commands between the host and the data storage system whereby the source area may be represented using a token. For simplicity, initial discussion may refer to a single source device including all the source ranges and a single target device including all target ranges. Subsequent discussion expands on the initial discussion whereby each of the source and target ranges may be located on a different device within the data storage system.

Figure 2:
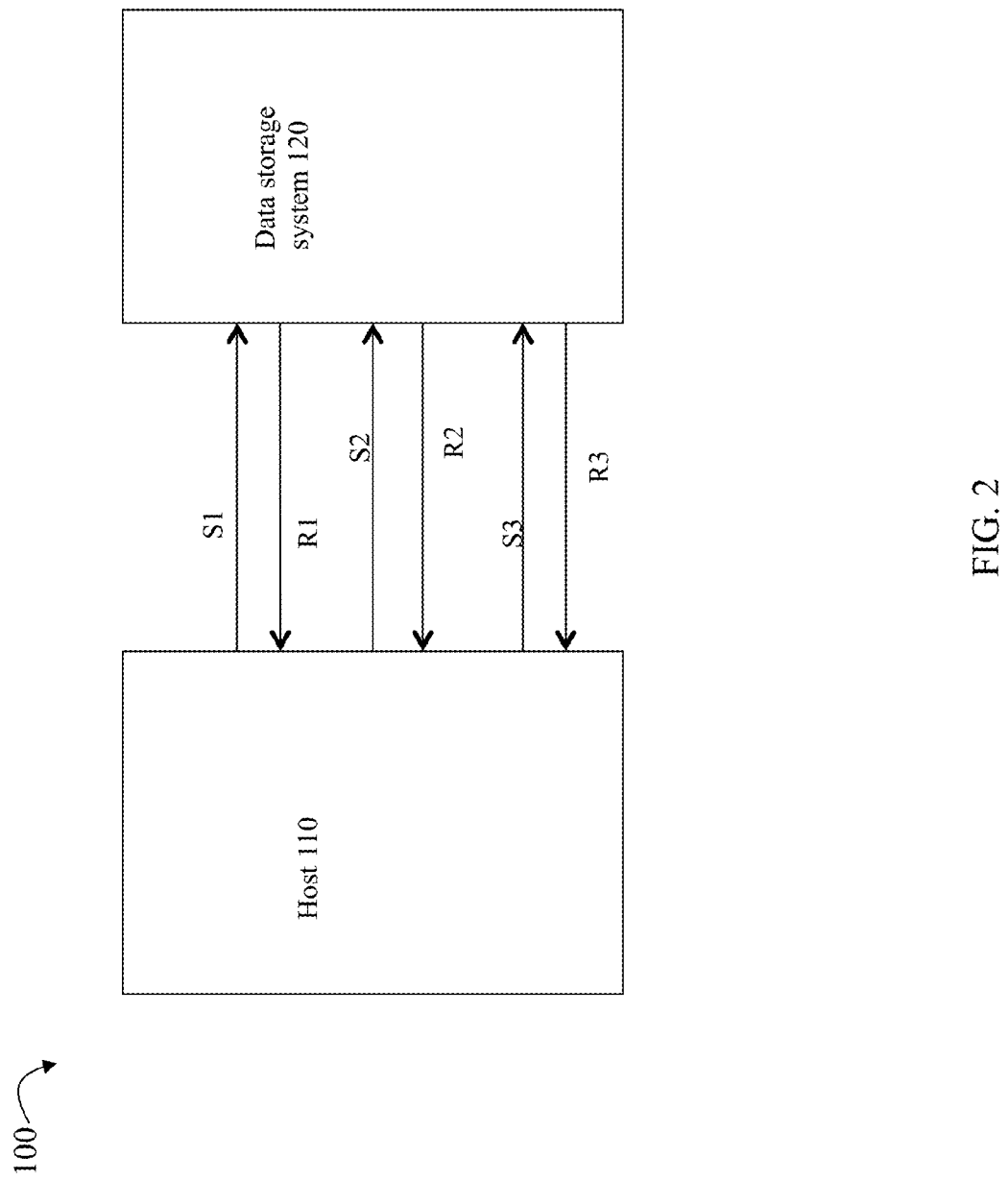
FIG. 2 is an example of messages that may be exchanged between a host and data storage system in an embodiment in accordance with techniques herein.

With reference to FIG. 2, shown is an example illustrating exchanges between a host 110 and a data storage system 120 in an embodiment in accordance with techniques herein. In a first step, S1, the host sends the source device of the data storage system a populate token command identifying the source area, from which data is copied, as a set of one or more source ranges (e.g. different possibly non-contiguous LBA ranges) on the source device. The populate token command, as well as other described herein, may be SCSI commands. Although it should be noted that other commands providing functionality as described herein may be used whereby such commands may or may not be SCSI commands.

The command requests that the data storage system generate a token, also referred to as an opaque token. Generally, the opaque token represents the source area (e.g., representing the set of one or more source ranges on the source device) as well as the particular data contents stored in the source area at a point in time when the opaque token is generated. The opaque token is described in more detail below. The one or more source ranges representing the source area may be included as parameters in the populate token command along with possibly other parameters depending on the embodiment. The data storage system may send a response or reply R1 indicating receipt of the command S1 and successful generation of the requested token corresponding to the source area.

In a second step S2, the host may send another command request to the data storage system to obtain or retrieve the opaque token generated by the data storage system in S1 for the populate token command. In response R2, the opaque token may be returned to the host by the data storage system. The host may use the opaque token to request in a third step S3 to copy data from a source area (as represented by the opaque token) to a destination or target area.

In step S3 the host may issue a write using token (WUT) command request to a target device of the data storage system whereby the WUT command may specify the source area by including the opaque token in the WUT command. The WUT command request may be generally characterized as the request from the host to perform a data movement or copy operation from a source area to a target area whereby the source area is denoted or represented by the opaque token. Parameters specified in the WUT command request payload may also identify the target area as one or more target ranges (e.g. different possibly non-contiguous LBA ranges) described elsewhere herein. Additionally, the parameters of the WUT command request may include, for example, a copy location offset, such as in logical blocks. The entire set of source ranges specified as the source area may be collectively viewed as a single logical representation of source data whereby each of the source ranges may be appended or concatenated in the logical representation. The starting location from which data is copied may be determined with respect to such a collective logical representation of appended source ranges whereby the copy location offset represents an offset with respect to the start of the logical representation of the source area or collectively appended source ranges. For example, assuming the offset represents a number of blocks, the starting copy location of the source data to be copied is obtained by adding the block offset relative to the first location in the above-mentioned logical representation of the source ranges. The offset may be an integer that is equal to or greater than zero and does not exceed the size of the logical representation. It should be noted that the host issuing the WUT command request may be the same host or a different host (or more generally different client) than the host which performed steps S1 and S2. Additionally, a host can repeatedly issue multiple additional WUT commands to the data storage system whereby each such additional WUT command may use the same opaque token to identify the source area and each such additional WUT command may specify the same or a different target area.

It should be noted that use of the WUT command request may be characterized as in one aspect as the host offloading the data movement to the storage system. For example, the copy is performed with less consumption of host and network resources (e.g., the data to be copied is copied internally within the data storage system from the source to the target area as opposed to having the data to be copied transmitted from the data storage system to the host and then from the host to the data storage system).

The opaque token is a token representing the source area (e.g., representing the set of one or more source ranges on the source device) as well as the particular data contents stored at the source copy location at a point in time when the opaque token is generated. The opaque token may be generated using any suitable technique. The opaque token may be generally characterized as an identifier formed to uniquely represent the source copy location on the source device at the particular point in time when the token is generated. The token generated may be dependent upon (e.g., may be generated using), for example, the source area (e.g. set of subranges or logical block addresses of the source device) and the date and time information (e.g., date/time stamp) at which the token is generated and/or the actual data contents stored at the source area when the token is generated. Thus, the token may serve to represent a point in time copy of the source data stored at the source area. The technique used to generate the token may allow the data storage system to also, given the token, determine the source area (e.g., the one or more source ranges) and whether the data content stored at the source area has been modified since the token was previously generated.

When the data storage system receives the opaque token as in connection with the WUT command, the data storage system may perform processing to determine the source area (e.g., set of source ranges) and whether the data of the source area has been modified since the token was previously generated. If any data of the source area has been modified since the token was generated, the token may be invalidated since it no longer represents the same point in time copy of the source data at the source area. The particular token generated may be dependent upon the data of the source area so that if the data contents of the source area changes, the generated opaque token also changes. For example, assume a first token is generated at a first point in time using the data contents at the source area. Processing may be performed at a second later point in time to determine whether the token is still valid.

In one embodiment using the above-mentioned tokens, all the ranges of the source area denoted by the opaque token may be included in a single source device (e.g., all source ranges of the source area may identify LBA ranges of the same source LUN). The source device may be implicitly specified as the device to which the populate token command request is directed in S1. In a similar manner, all the ranges of the target area may be included in a single target device. The target device may be implicitly specified as the device to which the WUT command request is directed in S3. However, as a variation, the same techniques using tokens may be generally directed to a source area including multiple non-contiguous LBA ranges whereby such ranges are not all located on the same source device. Each of the one or more of the source ranges may be located in a different source device. For example, as described elsewhere herein, each of the source ranges may be included in a different source device. In such an embodiment, the populate token command request may allow a client to specify a particular source device for each of the source ranges. Accordingly, the opaque token may be generated to also reflect the particular source device associated with each such range. In a similar manner, the techniques using tokens may be generally directed to a target area including multiple non-contiguous LBA ranges whereby such ranges are not all located on the same target device. Each of the target ranges may be included in a different target device. In such an embodiment, the WUT command request may allow a client to specify a different target device for each of the ranges of the target area. Thus, the WUT command request may include parameters whereby for each target range, a target device associated with the target range may be identified.

In one embodiment, the ranges, copy location offset, and the like, may be expressed in terms of atomic units which are blocks. Each block may be, for example 512 bytes. Additionally, the commands described in the exchanges between the host and data storage system may be SCSI commands.

With reference back to FIG. 2, in response to command issued to the data storage system in S3, the data storage system may return a response R3 denoting, for example, the status of the requested command of S3 (e.g., whether the command was successfully executed by the data storage system).

Use of such a token-based exchange of commands between the host and data storage system provides for an accelerated copying technique for reading and writing data within the data storage system. Without use of the token based mechanism such as described herein, the host may otherwise have to issue a first command to read data from the data storage system whereby the data is returned to the host, and a second command to write the data to the data storage system at the target location. In contrast, the token-based exchange of commands as described herein may be used to accelerate copy operations and optimize data transfer requests initiated from the host without requiring transfer of the data to be copied from the data storage system to the host and then from the host back to the data storage system. With the token-based technique, the data storage system determines the source data included at a source area using the opaque token and the copy location offset specified in the WUT command.

In response to receiving the WUT command request, the data storage system may translate the WUT command request into a data movement bulk copy request. It should be noted that the WUT command request may be generally characterized as one way in which an external data storage system client may initiate a bulk copy request. Additionally, it should be noted that the data movement bulk copy request may be initiated as a data storage system internal request rather than from an external client copy request. The data storage system internal request may be performed, for example, in connection with various operations and tasks performed within the data storage system and its management activities. For example, there may be code executing on the data storage system that initiates and issues a bulk copy request.

Described in following paragraphs is an exemplary interface of code of the data storage system that may be invoked to perform the bulk copy operation. Additionally, also described in following paragraphs are further examples and processing steps that may be performed to implement the bulk copy operation in an embodiment in accordance with techniques herein.

The following is an example of an application programming interface (API), or more generally, a defined interface for a routine, function, method, or other code entity on the data storage system invoked to perform the bulk copy operation. The API may be a defined interface for code included in a library of the data storage system whereby a call is made to the API in response to receiving either an external client request (such as described above in connection with the WUT command) or an internally originated data storage system request. The following is an example of a defined interface of an API invoked to perform a bulk copy operation:

Perform_bulk_copy_operation (
   source device 1, starting offset1, length1, . . .
   source device n, starting offset n, length n,
   target device 1, starting offset1, length1, . . .
   target device M, starting offset M, length M,
   copy location offset)

The name of the body of code, such as a named function, routine or method, invoked is Perform_bulk_copy_operation. The parameters are described in following paragraphs. The source area may have a logical representation that is a concatenation of one or more appended source ranges. Each source range may be represented in the defined interface above as a source device/starting offset/length triple such as denoted by three parameters such as "source device 1", "starting offset1", and "length1". For example, the first source range is located on "source device 1", such as LUN 1, having a length or LBA range denoted by the parameter "length 1" and beginning at the LBA denoted by the parameter "starting offset 1". In accordance with the above-noted interface, the request may include up to "n" such triples or sets of three parameters for each source range. The maximum number of "n" source ranges possible may vary with embodiment and may generally include any suitable number of one or more source ranges.

The target area may have a logical representation that is a concatenation of one or more appended target ranges. Each target range may be represented in the defined interface above as a target device/starting offset/length triple such as denoted by three parameters such as "target device 1", "starting offset1", and "length1". For example, the first target range is located on "target device 1", such as LUN 10, having a length or LBA range denoted by the parameter "length 1" and beginning at the LBA denoted by the parameter "starting offset 1". In accordance with the above-noted interface, the request may include up to "M" such triples or sets of three parameters for each target range. The maximum number of "M" target ranges possible may vary with embodiment and may generally include any suitable number of one or more target ranges.

The "copy location offset" parameter may represent an offset in the source area denoting the starting or initial location of data to be copied to the target area. In one embodiment, each of the source and target range starting offsets (e.g., "starting offset1" ... "starting offset n"), source and target range lengths (e.g., "length 1" ... "length n"), and the "copy location offset" may be expressed in units such as logical blocks. If "copy_location_offset" is zero, it means that copying begins with data located at the start of the first source range. An embodiment may require that the size or total amount of data to be copied, as denoted by the source area less any amount due to a non-zero value of "copy location offset", match the size of the target area as denoted by the target range(s).

Figure 3:
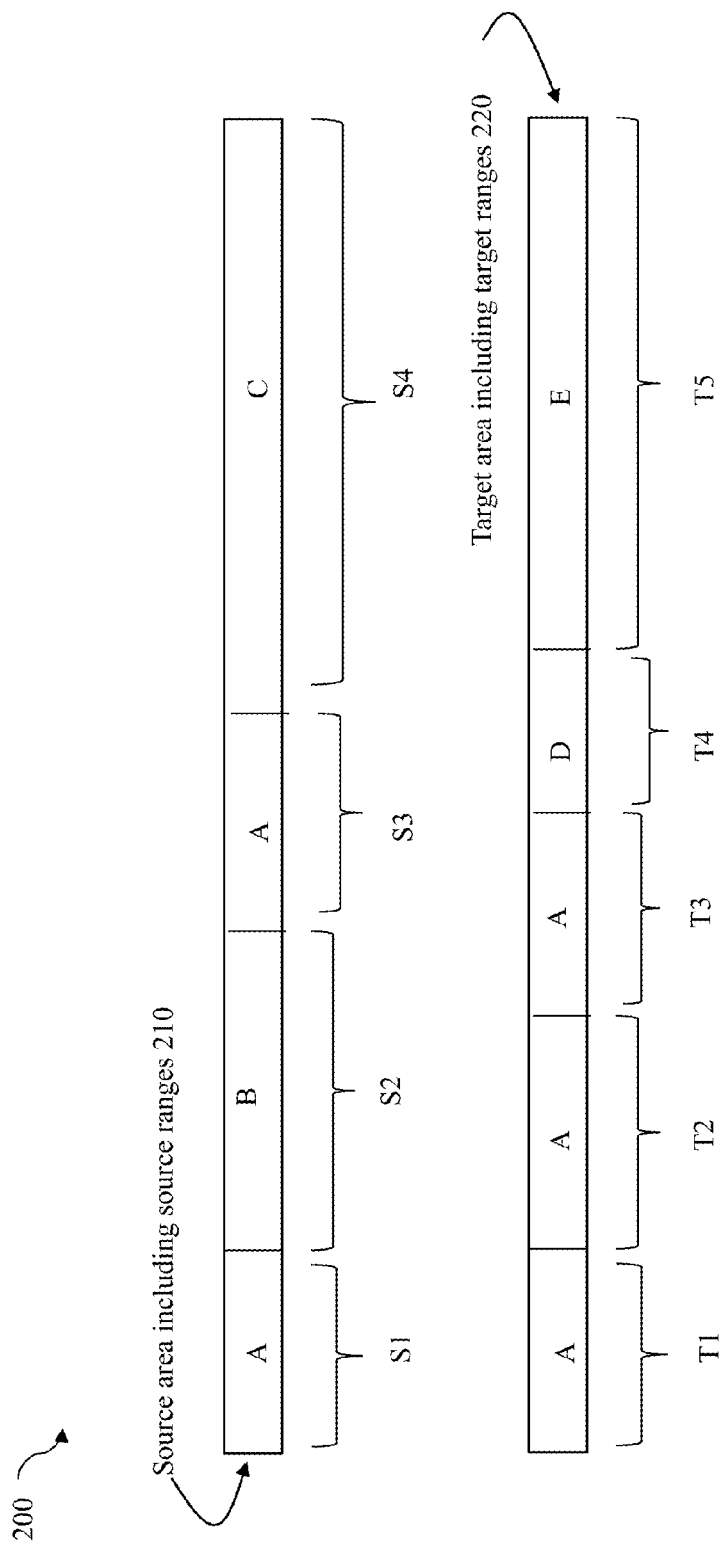

Referring to FIG. 3, shown is an example of a source area and a target area that may be used for performing a bulk copy operation in an embodiment in accordance with techniques herein. The example 200 includes a source area 210 which may include multiple source ranges. The target or destination area 220 may include multiple target ranges. In the example 200, the source area 210 includes 4 ranges (S1-S4) and the target area includes 5 ranges (T1-T5). Each of the foregoing ranges S1-S4 and T1-T5 may correspond to a logical address range portion of a device, such as a LUN. The logical address range portion may be, for example, expressed as a number of blocks whereby each block may represent some amount of storage such as 512 bytes. Each such range may be located on a device which may different or the same in comparison to other ranges. For example, the data storage system may include 4 LUNs—LUN 1, LUN 2, LUN 3 and LUN 4 whereby S1 may identify an LBA (logical block address) range on LUN 1, S2 may identify an LBA range on LUN 2, S3 may identify an LBA range on LUN 3 and S4 may identify an LBA range on LUN 4. As another example, S1 and S2 may identify different LBA ranges on the same LUN 3, and S3 and S4 may identify different LBA ranges on the same LUN 4. In a similar manner, each of the target ranges T1 through T5 may identify an LBA range of a LUN. For example, T1 and T2 may represent different LBA ranges on the same LUN 2 and T3, T4 and T5 may each identify an LBA range on the same LUN 4.

The example 200 also denotes the size of each range in 210 and 220 as represented using letters "A"-"E" in FIG. 3. "A" may represent the number of blocks in length spanning each of S1, S3, T1 and T3 (e.g., S1, S3, T1 and T3 are each of the same size). "B" may represent the number of blocks in length spanning S2. "C" may represent the number of blocks in length spanning S4. "D" may represent the number of blocks in length spanning T4. "E" may represent the number of blocks in length spanning T5.

Thus, an embodiment in accordance with techniques herein may provide for specifying source ranges and target ranges of different sizes whereby each of the ranges may be located on the same or different devices of the data storage system. The number of source ranges may be the same or may differ from the number of target ranges. Additionally, each such source range may be on the same or different device (e.g., LUN) with respect to the other source ranges. Each such source range may be the same or different size with respect to other source ranges. Each source range may also identify the same or different LBA ranges with respect to the other source ranges. Similarly, each target range may be on the same or different device with respect to the other target ranges, may be the same or different size with respect to other target ranges, and may identify the same or different LBA ranges with respect to the other target ranges.

For purposes of performing the bulk copy operation, whereby data is copied from the source area (comprising one or more source ranges of one or more source devices) to the target area (comprising one or more target ranges of one or more target devices), the entire set of source ranges specified as the source area 210 may be collectively viewed as a single logical representation of source data whereby each of the source ranges may be appended or concatenated in the logical representation. An embodiment may allow for the copy operation to specify an offset, also referred to as the copy location offset herein, denoting the starting copying location within the source area from which copying is to commence. In other words, the first byte of data that is copied from the source area may be located at an offset within the specified source area. Such a copy location offset may be 0 or may be an integer value greater than zero. Thus, the starting location from which data is copied may be determined with respect to such a logical representation 210 of appended source ranges whereby the copy location offset represents an offset with respect to the start of the logical representation of the source area. For example, assuming the copy location offset represents a number of blocks, the starting copy location of the source data in the source area is obtained by adding the block offset relative to the first location in the above-mentioned logical representation of the source ranges. The copy location offset may be an integer that is equal to or greater than zero and does not exceed the size of the logical representation of the source area. A copy location offset of zero means copying begins with data located at the first byte of the logical representation of the source area. In a similar manner, the entire set of target ranges specified as the target area 220 may be collectively viewed as a single logical representation of a target whereby each of the target ranges may be appended or concatenated in the logical representation.

Data may be copied from the source area 210 to the target area 220. Each block of source data that is copied from the source area may have a relative displacement, D1, from the initial block or starting point in the source area from which data is copied (e.g., starting point from which data is copied from the source area is determined by the copy location offset). D1 may be, for example, a positive integer value representing a displacement in terms of number of blocks from the location in the source area of the initial or first block of the source data that is copied. A block of source data is copied to a target location in the target area whereby the target location has a corresponding displacement D1 relative to the first or initial location in the target area.

Figure 4:
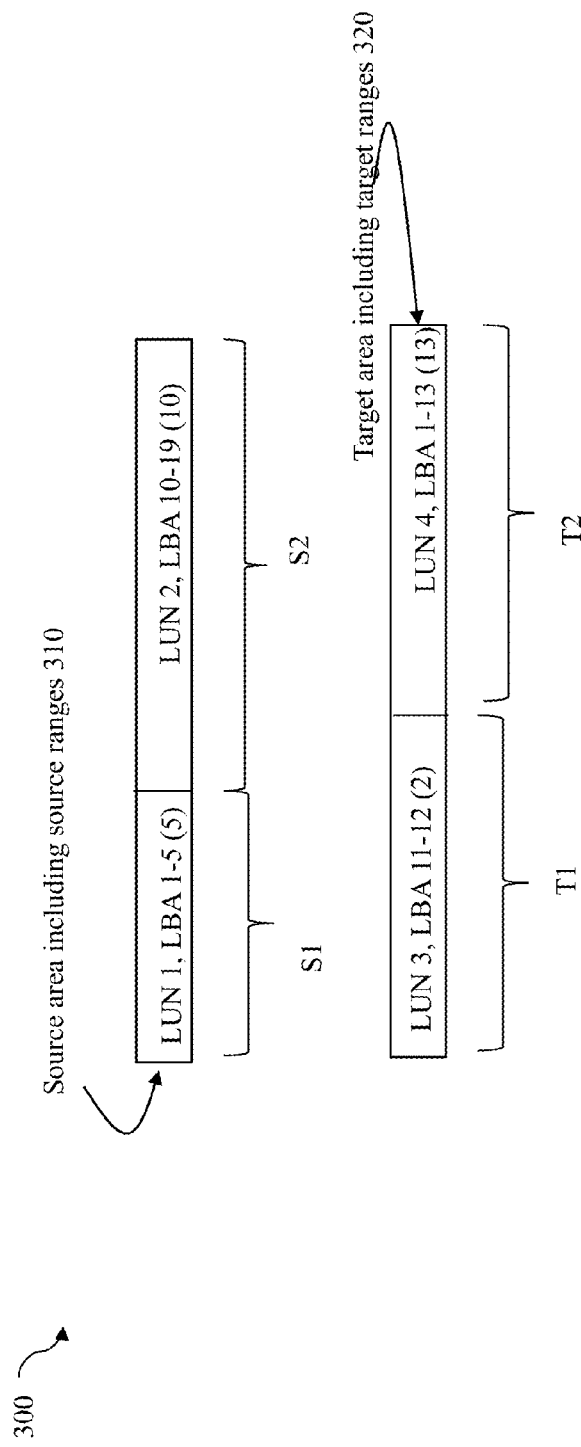

For example, with reference to FIG. 4, shown is an example 300 where data is copied from source area 310 having source ranges S1 and S2 whereby S1 is LUN 1, LBA range 1-5 (length 5 blocks) and S2 is LUN 2, LBA range 10-19 (length 10 blocks). The example 300 includes a target area having target ranges T1 and T2 whereby T1 is LUN 3, LBA range 11-12 (2 blocks) and T2 is LUN 4, LBA range 1-13 (length 13 blocks). Assume that that an offset of zero is specified meaning that the first block of data copied corresponds to the first block of the source area, LUN 1, LBA 1. The source area 310 has a size of 15 blocks and the target area 320 has a size of 15 blocks so that data from block 1 of the source area (e.g., LUN 1, LBA 1) is copied to block 1 of the target area (e.g. LUN 3, LBA 11), data from block 2 of the source area (e.g., LUN 1, LBA 2) is copied to block 2 of the target area (e.g., LUN 3, LBA 12), data from block 3 of the source area (e.g., LUN 2, LBA 10) is copied to block 3 of the target area (e.g., LUN 4, LBA 1) and the like, with respect to the remaining locations of the source and target areas of 300.

Figure 5:
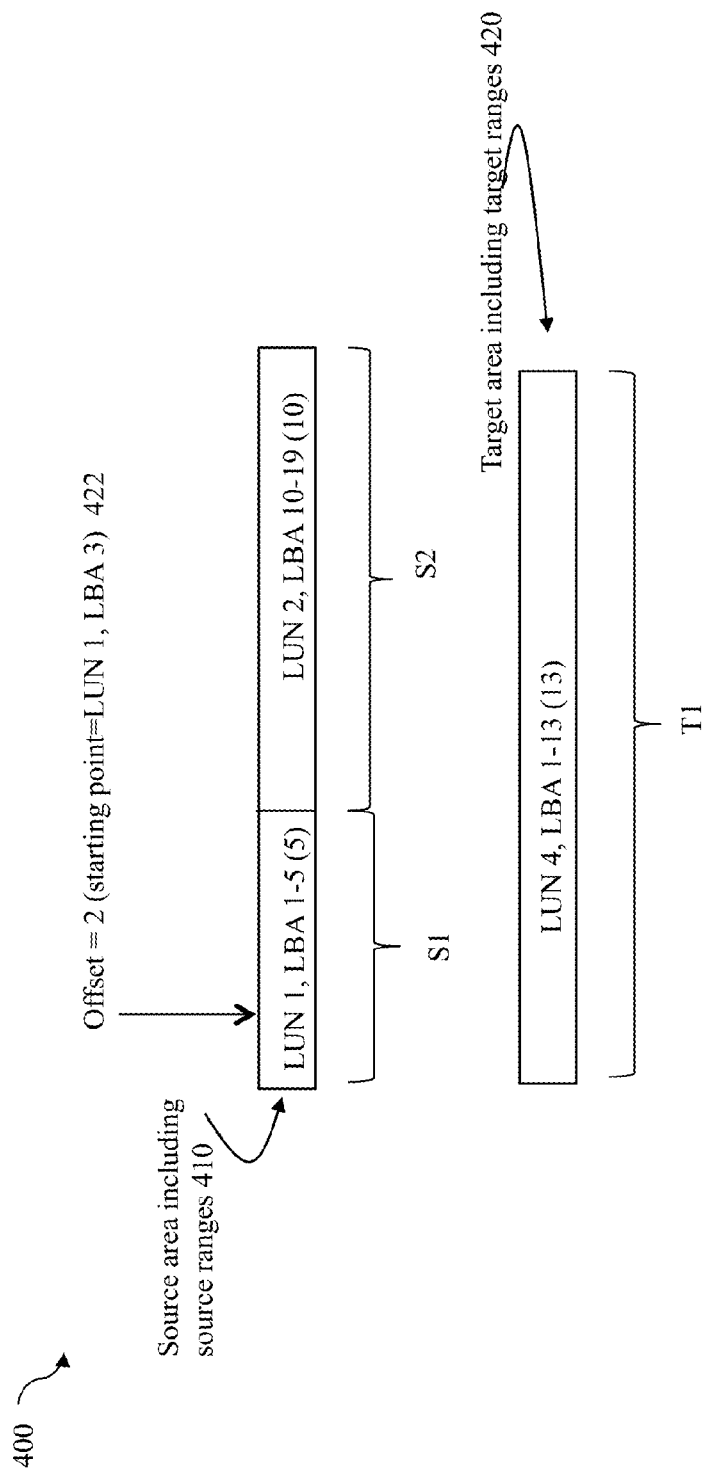

As a variation illustrating use of a non-zero offset within the source area denoting a starting location in the source area, reference is now made to FIG. 5. The example 400 includes source area 410 and target area 420. The source area 410 includes source ranges S1 and S2 as described in connection with the example 300. In this example, assume copying commences within the source area at copy location offset 3 thereby indicating that the first block of data of the source area that is copied is LUN 1, LBA 3 (as denoted by 422 whereby "3" denotes the third block in the source area, LUN 1, LBA 3, as the starting LBA location of the first block of data of the source area to be copied). Thus, a total of 13 blocks of data are copied from the source area. The target area 420 also has a size of 13 blocks as represented by the single target range T1 located at LUN 4, LBA 1-13. Although LUN 1, LBA 3 may be characterized as being located at block offset 3 within the source area, LUN 1, LBA 3 may be further characterized as having a displacement of 0 whereby the displacement is with respect to the starting location (block) of the data to be copied. In this manner, the first block of data to be copied is LUN 1, LBA 3 having a displacement=0 (whereby the displacement is with respect to the initial or first block of copied data) which is copied to a corresponding location LUN 4, LBA 1 in the target area (e.g., having a displacement=0 with respect to the start of the target area where the first block of data is copied.) The second block of data to be copied is LUN 1, LBA 4 having a displacement=1 which is copied to a corresponding location LUN 4, LBA 2 in the target area (e.g., having a displacement=1 with respect to the start of the target area.) The third block of data to be copied is LUN 2, LBA 10 having a displacement=2 which is copied to a corresponding location LUN 4, LBA 3 in the target area (e.g., having a displacement=2 with respect to the start of the target area.) In a similar manner, the remaining blocks of data of the source area 410 may be copied to corresponding locations in the target area 420.

Thus, generally, a block of source data has a displacement D denoting the offset with respect to the initial or first block of source data copied. The initial or first block of source data copied may be located at the start of the source area, or may be located at an offset or number of blocks within the source area as denoted by a copy location offset. A block of source data that is copied from the source area to the target area may be characterized as having a displacement D with respect to the first block of source data copied, and the block of data is copied to a corresponding location in the target area having displacement D with respect to the first location in the target area to which the first block of source data is copied.

In connection with copying data from the source area to the target area for a bulk copy operation, an embodiment may specify an interface, such as an API described elsewhere herein, with one or more parameters which identify the source ranges and associated source devices comprising the source area, the target ranges and associated target devices comprising the target area, and a copy location offset (within the source area at which the first block of data to be copied is located). The interface may also optionally include other parameters providing other information as may be used in an embodiment. The interface may be used to issue a request or call to code to perform the bulk copy operation whereby data is copied from the source area to the target area in a manner consistent with description herein in accordance with the specified parameters.

In one embodiment, the processing to perform the bulk copy operation may partition the bulk copy operation into multiple requests whereby each of the requests copies a portion of the data from the source area to the target area. In one embodiment, each request may copy the same amount of data. The size indicating the amount of data copied by each request may be determined as the largest size by which each of the source and target ranges can be evenly partitioned (e.g., with no remainder) whereby the request to copy a portion of the source data does not span or cross multiple source ranges and also does not span or cross multiple target ranges (e.g., since each of the foregoing ranges may be on a different device). It should also be noted that the size may also be determined in accordance with the foregoing, alone or in combination with, one or more other criteria such as, for example, data storage system-specific knowledge (e.g., maximum cached page size, multiple of a cache page size, and the like). Of course, the size of each data portion copied by a request may be subject to any further restrictions or limits that may be imposed by an embodiment. For example, the size of each data portion may be subject to a maximum size, boundary requirements (e.g., the data portion must be on a block boundary such as in units of 512 bytes), and the like.

Figure 6:
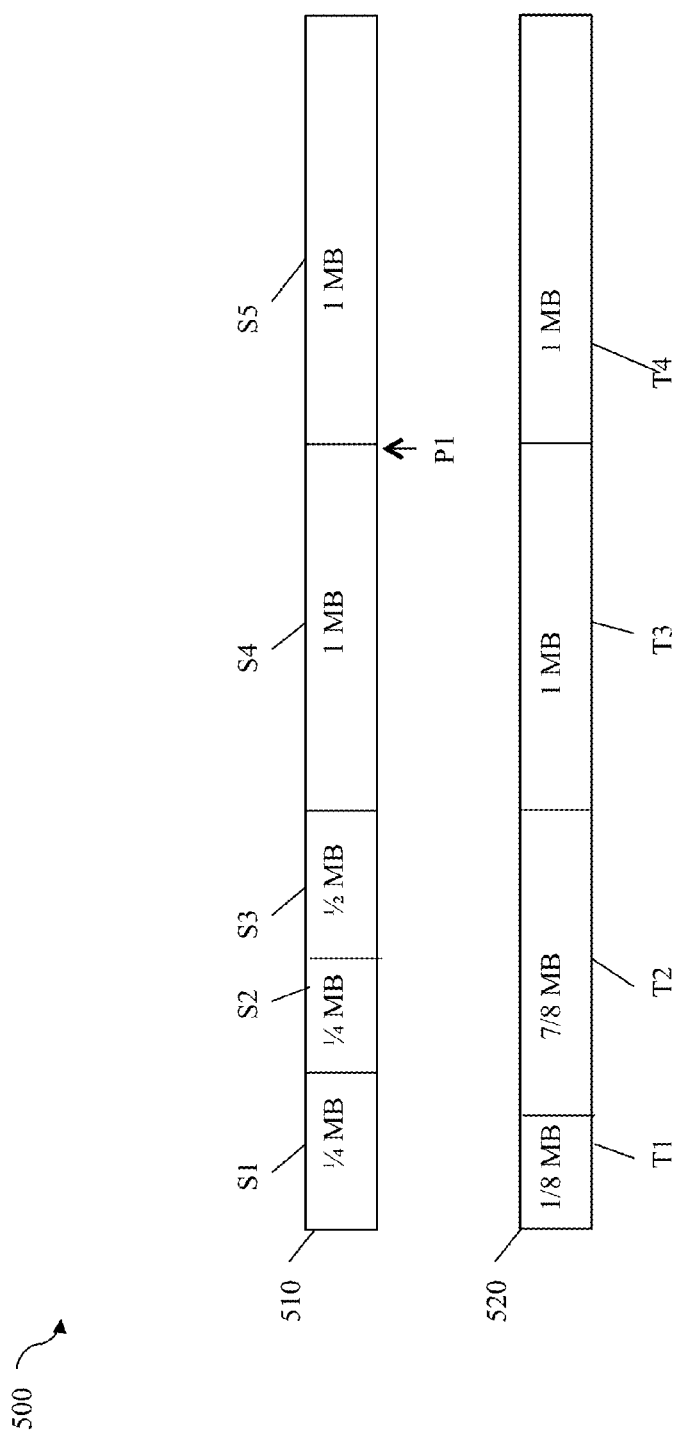

For example, with reference to FIG. 6, consider source area 510 including 5 source ranges S1-S5 and target area 520 including target ranges T1-T4. For ranges have the following sizes: S1 is ¼ MB (megabyte), S2 is ¼ MB, S3 is ½ MB, S4 is 1 MB, S5 is 1 MB, T1 is ⅛ MB, T2 is ⅞ MB, T3 is 1 MB and T4 is 1 MB. Based on the foregoing assuming copying begins from the source area at offset 0 (e.g., copy location offset is zero within the source area), the source and target areas are each 3 MB. The largest size by which each of the source and target ranges can be evenly partitioned is ⅛ MB. An embodiment may thus select ⅛ MB as the size of each request and perform the bulk copy operation to copy 3 MB of data from the source area by issuing 24 requests whereby each request copies a different ⅛ MB data portion from the source area to a corresponding location in the target area. In this example, the size of each range in the source area and target area may be expressed in terms of some unit, such as an integer number of MBs, and, as may be needed, some fraction thereof so that the amount of data copied by each request may be determined as the LCD (least common denominator) of the size of all such ranges. The LCD with respect to the size of all source and target ranges may be used to express the amount of data copied by each request if any such range has a size which, when expressed in terms of the MB or other unit, includes a fractional portion (e.g., each range does not specify an integer number of MBs but rather may include some fractional portion of a MB).

If the size of each range is an integer quantity with no fractional portion of MB, the amount of data copied by each request may be expressed as the largest factor which evenly divides all such sizes. For example, let the source area include 2 source ranges having the sizes 2 MB and 4, MB and the target area include a single target range of 6 MB. In this case, the amount of data copied by each request may be 2 MB (e.g., 2 is the largest number that evenly divides 2, 4 and 6) and the bulk copy operation may be performed by issuing 3 requests each copying 2 MB of data from the source area to the target area. Thus, the total number of requests needed to copy of all the source data from the source area may be determined as the total amount of data to be copied from the source area divided by the amount of data copied by each request.

With reference back to FIG. 6, the above-mentioned example was made with the assumption of a copy offset location in the source area of zero. If the copy offset location is non-zero, the above-mentioned processing may be accordingly modified such that a partitioned request to a copy a data portion of the source area to the target area does not span across any boundaries of the source ranges or the target ranges. For example with reference back to FIG. 6, assume the following variation. The source area is as illustrated by 510 of FIG. 6 with source ranges S1, S2, S3 S4 and S5. The target area does not include T1 and rather only includes T2, T3 and T4 as illustrated by 520. The copy location offset is ⅛ MB. Thus, the amount of data to be copied using the ⅛ MB offset within 510 is 2⅞ MB which also matches the size of the target area. In this case, rather than use a size of ¼ MB for S1, ⅛ MB is used as the size of S1 representing the amount of data copied from S1 when determining the amount of each data portion of the source area to be copied by each partitioned request. In this latter example, the initial bulk copy operation request may be partitioned into 24 requests each copying ⅛ MB of source data whereby each of the 24 partitioned requests does not span across any source range boundaries and also do not span across any target range boundaries (e.g., each ⅛ MB data portion that is copied is included in the source area at a location that does not span across a boundary of any of the one or more source ranges. Additionally, each ⅛ MB data portion of source data is copied to a corresponding location in the target area that does not span across a boundary of any of the one or more target ranges.

In some embodiments, batches of multiple requests each copying a portion of the source data may be issued in parallel. The particular number of requests issued in parallel and allowed to be pending or outstanding at a point in time may vary with the particular limits and capabilities of each system and embodiment. As such, the outstanding requests each copying a portion of the source data may complete asynchronously and not in the order in which the requests were actually initiated or issued. An embodiment may assign a sequence number to each of the multiple requests copying a portion of the source data whereby the sequence number of a request may uniquely identify that request from all others. One embodiment may assign sequence numbers from an integer sequence such that each subsequent request issued a point in time "N" has a higher sequence number than all other previously issued requests. Additionally, the ordering of the sequence numbers corresponds to the order in which the requests associated with the sequence numbers are issued. For example, a first request issued to copy a data portion at time "N" may have sequence number "N". The request issued immediately prior to the first request at time "N−1" will have sequence number "N−1". The request issued at time "N+1" immediately following the first request may have sequence number "N+1".

Described herein, such as in connection with FIGS. 3, 4, 5 and 6, is a logical representation of the source area formed by concatenating or appending each of the source ranges. The data may be copied from the source area to the target area based on a left to right positioning of the data with the logical representation. In this manner with respect to the logical representation of the source area, a first data portion copied by a request issued at point in time "N" may be characterized as immediately consecutive or adjacent to (e.g., immediately to the right of) a second data portion copied by the last previously issued request at point in time "N−1". Similarly, a request issued at point in time "N+1" is a request to copy a third data portion that immediately follows the first data portion in the logical representation of the source area. Furthermore, in accordance with the logical representation of the source area of the source data to be copied, the foregoing 3 data portions may be characterized as logically contiguous within the source area and may be located within the source area, from left to right, in the following order: second data portion (sequence number/point in time "N−1"), first data portion (sequence number/point in time "N"), third data portion (sequence number/point in time "N+1"). The first data portion copied by the request issued at point in time "N" may be located at a displacement D1 within the source area (where D1 is relative to the starting or initial copy location of the source area). In a similar manner the third data portion copied by the request issued at point in time "N+1" may be located at a displacement D3 within the source area and the second data portion copied by the request issued at point in time "N−1" may be located at a displacement D2 within the source area. In connection with the foregoing, the following will be true D2<D1<D3.

Thus, requests may be issued to copy data portions from the source area in a contiguous sequential order based on a left to right logical positioning of the data portions in the logical representation of the source area (e.g., whereby the logical representation of the source area may be a concatenation of appended source ranges). A data portion located at displacement D within the source area (where D measures a positive distance from the starting or initial copy location of the source area) may be copied to a corresponding location within the target area (e.g., located at displacement D within the target area). As each request to copy a data portion completes, processing may be performed to issue another request to copy the next logically consecutive data portion of the source area. An embodiment may maintain a list of outstanding requests and associated sequence numbers as described elsewhere herein. An embodiment may also maintain a first pointer identifying the location in the source area of the next data portion for which a request is issued to copy data. For example, with reference back to FIG. 6, P1 may represent the first pointer at a first point in time denoting the location in the source area of the next data portion to be copied to a corresponding location in the target area. At the first point in time, requests have already been issued to copy all data located in the source area 510 to the left of P1 and requests have yet to be issued to copy all data located at, and to the right of, P1 in the source area. P1 may also be referred to as a source cursor identifying the location or point in the source area of the next data portion for which a partitioned request is to be issued for copying. As described herein, data copied from the source area may be characterized as being a distance or displacement D from the starting or initial copy location of the source area. Such data located in the source area may be copied to the target area at a target location that is the same distance or displacement D from the starting location of the target area.

An embodiment may track the progress of the bulk copy operation as the different data portions are copied from the source to the target area. As described herein, data portions in the source area may be characterized as logically contiguous within the logical representation of the source area. As also described elsewhere herein in more detail, the logical representation of the source area may be formed by concatenating or sequentially and consecutively appending the source ranges together. An embodiment may track the progress of the bulk copy operation such as by reporting an amount of data (e.g., number of bytes or blocks) copied so far. The amount of data reported as having been copied at a point in time may be the amount of data that has been copied from the source area whereby all such data is logically contiguous within the source area as determined from the initial of starting copy location up to a displacement or distance from the starting copy location. Thus, the amount of data reported as copied corresponds to a displacement or distance D from the starting copy location of the source area whereby all data having a displacement less than D has been copied to a corresponding location in the target area. For example, with reference to FIG. 6 with respect to P1 as just described, such an embodiment may report that 2 MB of data has been copied from source area 510 if all the data in source ranges S1, S2 S3 and S4 has been copied to the target area 520. As a variation if, for example, all data from S1, S2 and S4 has been copied but all requests to copy data from S3 are still outstanding (e.g., no data from S3 has yet been copied), then the amount of data reported as copied is ½ MB since the logically contiguous portion of data of the source area copied includes only all of S1 and S2 data. At a later point in time when all data from S3 is copied, the amount of data reported as copied is 2 MB since the logically contiguous data of the source area that has been copied now includes S1, S2, S3 and S4.

Figure 7:
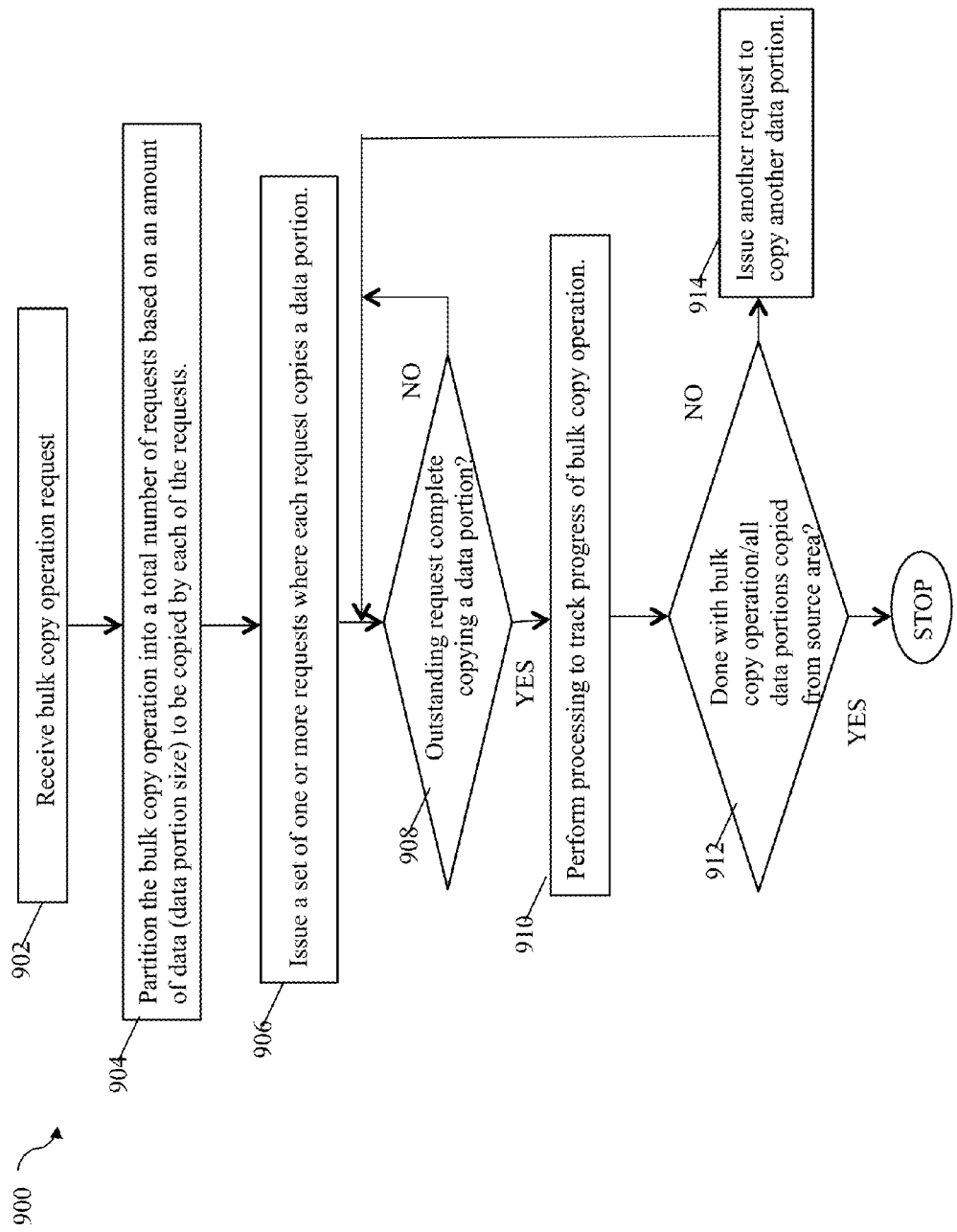
FIGS. 7, 8 and 9 are flowcharts including processing steps that may be performed in an embodiment in accordance with techniques herein.

Referring to FIG. 7, shown is a flowchart of processing steps summarizing processing that may be performed in an embodiment herein to perform a bulk copy operation. At step 902, a bulk copy operation request is received. As described herein, the bulk copy operation request may be, for example, an API call that includes parameters specifying a source area of one or more source ranges, and associated source devices, a target area of one or more target ranges and associated target devices, and an offset into the source data area from which copying of data commences. As also described herein and not illustrated in FIG. 7, the request to perform the bulk copy operation as represented by the API call may be generated in response to another originating request, such as from an external data storage system client a host. In any case, in step 902, an API call is made to code in the data storage system to request performing processing for the bulk copy operation.

At step 904, the bulk copy operation may be partitioned into a total number of requests each of which copies a data portion from the source data area. The size of the data portion is based on a determination of an amount of data to be copied by each of the total requests. As described herein, the size of the data portion copied by each of the total number of partitioned requests may vary with the size of each source range and each target range. The total number of requests needed to copy all the source data from the source data area is based on the determined amount of data copied by each such request (e.g., total amount of data to be copied divided by the amount of data copied by each request). At step 906, a set of one or more requests are issued whereby each request copies a data portion of the determined size in step 904. The requests issued in step 906 may be issued in parallel. The number in the set issued in parallel may be based on the limits and capabilities of the system. As described herein, each request may be assigned a sequence number in accordance with an integer sequence. The sequence number may be used to track each request since such requests may complete asynchronously and may therefore complete in order with respect to the sequence numbers or out of sequence number order. The sequence number assigned to a request is based on the data portion being copied from the logical representation of the source area. The sequence number may increase based on the data portion's displacement within the source area whereby the displacement represents a displacement with respect to the initial or starting copy location within the source area. In this manner as described elsewhere herein, the sequence numbers associated with completed and outstanding requests may be used to track the progress of the bulk copy operation such as in terms of the amount of logically contiguous data of the source area that has been copied. At step 908, a determination is made as to whether an outstanding request has completed copying a data portion. Processing remains at step 908 until step 908 evaluates to yes. If step 908 evaluates to yes, control proceeds to step 910 to perform processing to track the progress of the bulk copy operation. Additional detailed processing that may be performed by an embodiment in connection with step 910 is described elsewhere herein. At step 912, a determination is made as to whether processing is complete for the bulk copy operation whereby all data portions have been copied from the source area to the target area. If step 912 evaluates to yes, processing stops. If step 912 evaluates to no, control proceeds to step 914 to issue another request to copy another data portion from the source area. The next data portion copied by the request in step 914 may be the next logically consecutive data portion (of the logical representation of the source area) immediately following the last data portion for which a copy request was issued. Control then proceeds to step 908 to await completion of an outstanding request to copy a data portion from the source area to the target area.

Figure 8:
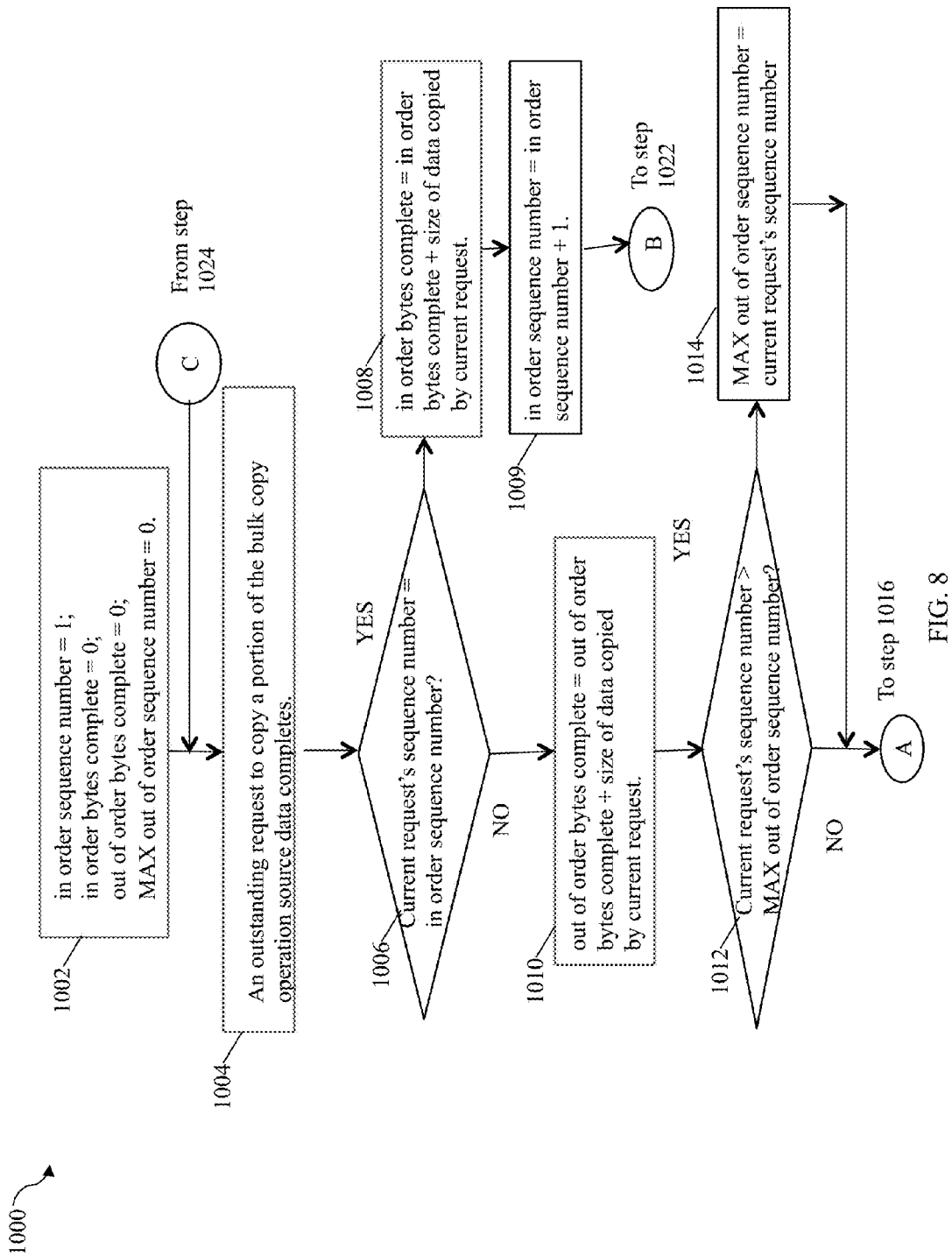
Figure 9:
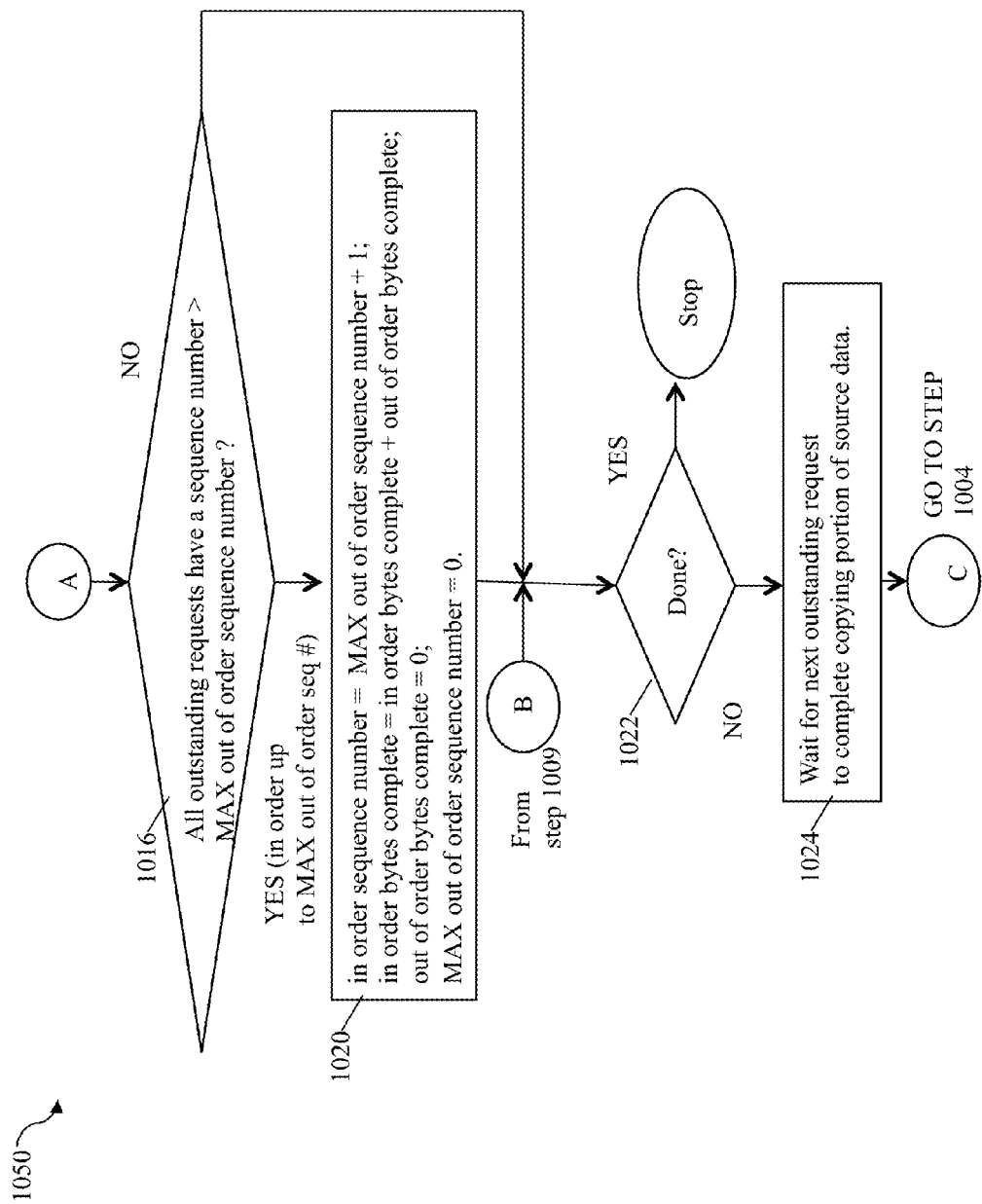

What will now be described with reference to FIGS. 8 and 9 is one embodiment for tracking and determining an amount of data that has been contiguously copied from the source to the destination in connection with a data movement bulk copy request. As described elsewhere herein, an embodiment may report the amount of logically contiguously copied bytes of data regarding the progress of the bulk copy operation. Such information may be used, for example, in determining where to resume the bulk copy operation should the current bulk copy operation terminate or otherwise fail for some reason without completely copying all the source data to the target area. It should be noted that such termination or failure to copy all the source data to the target area may occur for any number of reasons (e.g., explicit termination request, a write or modification to the source data in the source area, and the like).

As described herein, the single bulk copy request may be partitioned into multiple smaller requests each of which, when completed, results in copying a portion of the source data from the source to the target area. As such, the amount of logically contiguous data that has been copied may represent that logically contiguous portion of the total source data that has been copied to the target at a point in time (e.g., the copied contiguous data has a size that is less than or equal to the total source data and commences at the first byte of the source data). As described elsewhere herein, the logically contiguous data may be determined with respect to the logical representation of the source area as a concatenation of appended source ranges.

Referring to FIGS. 8 and 9, shown are processing steps that may be performed in an embodiment in accordance with techniques herein in response to portions of the bulk copy operation completing. As described elsewhere herein, a single bulk copy request may be accomplished using techniques herein by issuing multiple copy requests each copying a portion of the source data. Processing of flowcharts 1000 and 1050 describes steps of one way in which the amount of logically contiguous data that has been copied may be determined. Processing of 1000 and 1050 provide further detail regarding processing steps 910, 912 and 914 of flowchart 900.

At step 1002, various items of state information—in order sequence number, in order bytes complete, out of order bytes complete, and MAX out of order sequence number—may be initialized. The foregoing items are described in more detail in following paragraphs. It should be noted that step 1002 may performed sometime prior to completing the first request to copy a data portion for the bulk copy operation.

In step 1002, in order sequence number may be initialized to 1. The in order sequence number is the sequence number associated with the next outstanding request which, when completed, will have copied the next contiguous portion of the source data. As described elsewhere herein, each request to copy a portion of the source data to the target may be assigned a different unique sequence number. In this manner, the sequence number may be used to uniquely identify and distinguish each outstanding request to copy a portion of the source data and may be used to track when an outstanding request has also completed copying the data portion to the target area. An embodiment may assign sequence numbers from an integer number sequence whereby each subsequent request has a sequence number higher than a previously issued request. In connection with subsequent processing steps, all sequence numbers associated with copy requests having a sequence number less than the in order sequence number are those associated with completed requests that have copied a contiguously located portion of the source data.

In step 1002, in order bytes complete may be initialized to 0. In order bytes complete represents the total amount of in order or contiguous amount of bytes copied at a point in time from the source to the target for the bulk copy. In order bytes complete represents the amount of data that has been copied by completed requests having associated sequence numbers that are less than the state variable in order sequence number. As described below, in order byte complete represents the number of logically contiguous bytes, as determined with respect to the starting or initial copy location in the source area, that have been copied to the target area.

In step 1002, out of order bytes complete may be initialized to 0. Out of order bytes complete represents the amount of data that has been copied to the target area and which is not logically contiguous with respect to the start of the source data (or more generally the starting or initial copy location since the copying may optionally begin at a non-zero offset within the source area). In other words, there is at least one outstanding request for copying a data portion of the source data whereby the outstanding request has a sequence number that is greater than in order sequence number. The sum of in order bytes complete and out of order bytes complete represents the total amount of the source data (both contiguous and non-contiguous) that has been copied from the source to the target at a point in time.

In step 1002, MAX out of order sequence number may be initialized to 0. MAX out of order sequence number represents the maximum or largest sequence number associated with a completed request to copy a data portion.

At step 1004, an outstanding request to copy a portion of the bulk copy operation source data completes. In following steps, the outstanding request (to copy a portion of the source data) that has just completed may be referred to as the current request or currently completed request having a status that has just transitioned from incomplete or outstanding to complete. At step 1006, a determination is made as to whether the current completed request has a sequence number that is equal to the current value of in order sequence number. If step 1006 evaluates to yes, it means that the current request has completed in sequence order and has copied the next logically contiguous data portion from the source area. If step 1006 evaluates to yes, control proceeds to step 1008 where in order bytes complete is incremented by the size of the data copied by the current request. In step 1009, in order sequence number is incremented by 1. From step 1009, control proceeds to step 1022 described below.

If step 1006 evaluates to no, control proceeds to step 1010 where out of order bytes complete is incremented by the size of the data copied by the current request. From step 1010, control proceeds to step 1012 where a determination is made as to whether the current request's sequence number is greater than MAX out of order sequence number. If step 1012 evaluates to yes, control proceeds to step 1014 where MAX out of order sequence number is assigned the current request's sequence number. From step 1012, control proceeds to step 1016. If step 1012 evaluates to no, control proceeds directly to step 1016.

In step 1016, a determination is made as to whether all outstanding requests have a sequence number that is greater than MAX out of order sequence number. If step 1016 evaluates to yes, then control proceeds to step 1020. In step 1020, the items of state information are updated as follows:

in order sequence number=MAX out of order sequence number;

in order bytes complete=in order bytes complete+out of order bytes complete;

out of order bytes complete=0; and

MAX out of order sequence number=0.

From step 1020, control proceeds to step 1022. If step 1016 evaluates to no, control proceeds directly to step 1022. In step 1022, a determination is made as to whether the bulk copy operation has completed in that all data portions from the source have been copied to the destination. If step 1022 evaluates to yes, processing stops. If step 1022 evaluates to no, control proceeds to step 1024 where a subsequent request to copy another portion of the source data may be issued, if needed, and processing waits for the next outstanding request to complete copying a portion of the source data. It should be noted that in step 1024, there may be no need to issue any further new requests whereby all source data portions will be copied when any remaining outstanding requests complete. From step 1024, processing proceeds to step 1004 to process the next outstanding request that completes copying a portion of the source data of the bulk copy operation.

Referring to FIG. 10, shown is an example illustrating use of processing described herein when processing completed requests. The example 1100 illustrates in further detail the processing of flowcharts 1000 and 1050. In this example for simplicity of illustration, assume that the bulk copy operation may be partitioned into 10 requests each of a same size of 1 unit, such as 1 byte. Also, the system issues the 10 requests in parallel so that there are 10 pending or outstanding requests which, after completion, will have copied all the source data to the destination or target. The sequence numbers of the 10 requests are numbered 1 through 10 whereby for all sequence numbers, i, from 1 through 10 inclusively, request "i" (e.g., request having sequence number "i") is issued immediately prior to request "i+1" (e.g., request having sequence number "i+1"). The requests may complete asynchronously in any order.

Element 1120 represents the ordering in which the outstanding 10 requests having the denoted sequence numbers complete in this example. Element 1110 represents the 4 state variables described in connection with the flowcharts of FIGS. 8 and 9. Element 1130 represents the values of the variables of 1110 after each of the 10 outstanding requests completes. Elements 1120*a*-*k* included in 1130 each represent a column of values denoting the specific values of the state variables 1110 after one of the requests identified by the column header has completed and after processing of FIGS. 8 and 9 has been performed for that particular completed request.

Element 1120*a* represents the start state of the processing after all 10 requests have been issued and are outstanding but whereby none of the 10 outstanding requests have completed (e.g., after completing step 1002 of FIG. 8). At a first point in time as represented by 1120*b*, a request with sequence number 3 completes. After performing processing as described in FIGS. 8 and 9 for the request with sequence number 3, element 1120*b* represents the values of the state variables 1110. At a second point in time as represented by 1120*c*, a request with sequence number 5 completes. After performing processing as described in FIGS. 8 and 9 for the request with sequence number 5, element 1120*c* represents the values of the state variables 1110. At a third point in time as represented by 1120*d*, a request with sequence number 2 completes. After performing processing as described in FIGS. 8 and 9 for the request with sequence number 2, element 1120*d* represents the values of the state variables 1110. In a similar manner at subsequent points in time, requests with sequence numbers 1, 4, 7, 6, 8, 9 and 10 complete in this specified order. Each of elements 1120*e*-*k*, respectively, represents the values of the state variables 1110 after performing processing as described in FIGS. 8 and 9 for a corresponding one of the requests completed at the different points in time in the foregoing sequence denoted by 1120.

The value of the in order bytes complete state variable 1104 may denote the tracked progress of the number of logically contiguous bytes for which copying from the source to the target has been completed. Also, the value of in order sequence number 1102 denotes the sequence number associated with the next outstanding request which, when completed, will have copied the next logically contiguous portion of the source data. Thus, should the bulk copy operation terminate prior to completion, the state variables 1104 and 1102 may denote that point in the source data (and associated request) at which copying may resume.

What will now be described below is a code portion as further example illustrating in more detail how the foregoing processing of FIGS. 8 and 9 may be implemented. The following code portion is written using C language-like statements. In the code portion, dm_bulk_request is a data structure including the items needed for performing a single bulk copy operation whereby such items are represented as the following fields of the structure:

lock—used to lock the structure for exclusive access.

in_order_sequence number—represents element 1102 as in the example 1100.

requests—an array of outstanding requests (issued but not yet completed) each of which includes state information for one request copying a portion of the source data. Each array entry may include a sequence_number field denoting the sequence number assigned to the request and a pointer to a request structure of information regarding information used to copy a portion of the source data. Such information may identify, for example, the portion of the source data to be copied and the destination location to where such source data is copied.

in_order_bytes_complete—represents element 1104 as in the example 1100.

out_of_order_bytes_complete—represents element 1106 as in the example 1100.

newest_out_of_order_sequence_number—represents element 1108 as in the example 1100.

Below is the code portion with additional annotated comments:

```
/*******************************************
*************************
* If this request is completing in sequence order, then
accumulate
* the transferred bytes in the 'in order' bucket. Otherwise
it goes
* in the 'out of order' bucket.
* dm_request_piece is an integer index of an element of
the outstanding request
* array, dm_bulk_request->request, identifying the cur-
rent request that has just completed.
* bytes_requested_for_transfer is the number of bytes
copied by the current request.
*******************************************
************************/
EmcpalSpinlockLock(&dm_bulk_request->lock); /* lock
dm_bulk_request structure using spinlock */
  if (dm_bulk_request->in_order_sequence_number==
    dm_bulk_request->requests[dm_request_piece].sequen-
      ce_number)
  {
    dm_bulk_request->in_order_bytes_complete+=
      bytes_requested_for_transfer;
    dm_bulk_request->in_order_sequence_number++;
  }
  else
  {
    dm_bulk_request->out_of_order_bytes_complete+=
      bytes_requested_for_transfer;
/*******************************************
********************
* Record the highest out of order sequence number we've
    seen
* complete. If all currently outstanding requests have a
* higher sequence number then we can safely dump the
    out-of-order
* bucket into the in-order bucket.
*******************************************
******************/
    if   (dm_bulk_request->requests[dm_request_piece].se-
      quence_number>
      dm_bulk_request->newest_out_of_order_sequence
        number)
    {
      dm_bulk_request->newest_out_of_order_sequen-
        ce_number=
        dm_bulk_request->requests[dm_request_piece].se-
          quence_number;
    }
/************************************
* For loop below implements step 1016 from flowchart
    1050.
* Max_bulk_requests_acquired is the maximum size of
    the requests array denoting the
* maximum number of possible outstanding requests
************************************/
```

```
for (i=0; i<global->max_bulk_requests_acquired; i++)
{
    /*************************************************
     *******************
     * Skip over unused pieces. Assumption is that requests
       array of outstanding
     * requests has elements that are used sequentially so
       that the first null element
     * denotes that such an array element and subsequent
       elements of the array are
     * unused.
     **************************************************
     *****************/
    if(dm_bulk_request->requests[i]request==NULL)
    {
        break;
    }
    if  (dm_bulk_request->newest_out_of_order_sequen-
         ce_number>
         dm_bulk_request->requests[i].sequence_number)
    {
        found_in_order_sequence=FALSE;
        break;
    }
}
if (found_in_order_sequence) /* step 1020 processing of
    flowchart 1050 when step 1016 evaluates to yes */
{
    dm_bulk_request->in_order_bytes_complete+=
        dm_bulk_request->out_of_order_bytes_complete;
        dm_bulk_request->in_order_sequence_number=
        dm_bulk_request->requests[dm_request_piece].
            newest_out_of_order_sequence_number+1;
        dm_bulk_request->out_of_order_bytes_com-
            plete=0;
        dm_bulk_request->newest_out_of_order_sequen-
            ce_number=0;
}
}
EmcpalSpinlockUnlock(&dm_bulk_request->lock);    /*
release lock on dm_bulk_request structure */
/*******************************************************
*************************
 * Reset the data movement bulk request copy operation
management structure now that
 * this outstanding partitioned request has completed.
 ******************************************************
***********************/
    status=DM_bulk_request_reinit_piece(
    request->Handle,
    &dm_bulk_request->requests[dm_request_piece]);
```

In accordance with such techniques, minimal locking may be used as noted above to lock the management structure for exclusive use when performing processing.

It should be noted that an embodiment may also track and maintain other information that may vary with each such embodiment. For example, in connection with an originating request to perform a bulk copy operation from a client, such as a host, that is external from the data storage system, an embodiment may determine and track the response times associated with each client request. Response time may be characterized as the amount of time it takes the data storage system to complete the request once received (e.g., time from when the request is received until the time a response to the request is sent to the client such as the host). Such information may be regarding response time may be accumulated over a time period and used for a variety of purposes such as, for example, reporting on performance.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing a copy operation comprising:
receiving, using a processor, a first request to perform a copy operation, said first request including a set of parameters including a source area and a target area, wherein said source area includes one or more source ranges and one or more source devices, wherein said target area includes one or more target ranges and one or more target devices, wherein the source area has a logical representation as a concatenation of said one or more source ranges;
partitioning, using a processor, the first request into a plurality of other requests, each of the plurality of other requests being a request to copy a portion of source data located in the source area to a corresponding location in the target area;
issuing, using a processor, the plurality of other requests that copy the source data from the source area to the target area; and
reporting, using a processor, a first amount of the source data as copied to the target area at a point in time prior to completely copying the source data to the target area, wherein the first amount represents a size of a logically contiguous region of the source data at the point in time that has been copied from the source area to the target area in accordance with the logical representation of the source area, wherein, at the point in time of said reporting, said first amount reported does not include a size of a first portion of the source data that has been copied to the target area wherein the first portion has a location in the source area that is not logically contiguous with the logically contiguous region.

2. The method of claim 1, wherein each of said one or more source ranges identifies a portion of a logical address range of a different one of the one or more source devices, wherein each of said one or more target ranges identifies a portion of a logical address range of a different one of the one or more target devices.

3. The method of claim 2 wherein said one or more source ranges of the source area include a plurality of source ranges, the one or more source devices include a plurality of source devices, a first of the plurality of source ranges is located on a first of the plurality of source devices and a second of the plurality of source ranges is located on a second of the plurality of source devices different from the first source device.

4. The method of claim 3, wherein said one or more target ranges of the target area include a plurality of target ranges, the one or more target devices include a plurality of target devices, a first of the plurality of target ranges is located on a first of the plurality of target devices and a second of the plurality of target ranges is located on a second of the plurality of target devices different from the first target device.

5. The method of claim 4, wherein a first number of source ranges specified by the plurality of source ranges of the source area is different than a second number of target ranges specified by the plurality of target ranges of the target area.

6. The method of claim 4, wherein each of the plurality of source ranges and each of the plurality of target ranges specifies a logical block address range and at least a first of the plurality of source ranges specifies a first logical block address range that is different from a second of the plurality of source ranges and wherein the first logical block address range of the first source range is also different than a second logical block address range of a first of the plurality of target ranges.

7. The method of claim 2, wherein said parameters include an offset denoting an offset within the source area from which to commence copying data for the copy operation of the first request.

8. The method of claim 7, wherein processing for at least some of the other requests each copying a portion of the source data from the source area to the target area is performed in parallel.

9. The method of claim 8, wherein a sequence number is assigned to each of the plurality of other requests prior to said issuing to uniquely identify said each other request.

10. The method of claim 9, wherein said plurality of other requests are issued in a first order in accordance with an ordering of sequence numbers assigned to said plurality of requests and at least a first of the other requests completes out of order with respect to said ordering of sequence numbers.

11. The method of claim 10, wherein the first amount includes all data portions of the logical representation located within the logically contiguous region of the logical representation of the source area, said logically contiguous region beginning with a starting location in said source area and ending at a second location in said source area, said starting location denoting an initial location in the source area from which copying commences for the copy operation.

12. The method of claim 11, wherein the starting location is determined in accordance with said offset.

13. The method of claim 12, wherein, if the copy operation terminates prior to copying all the source data from the source area to the target area, the copy operation subsequently resumes copying a remaining portion of the source data logically located in the source area following the logically contiguous region.

14. The method of claim 7, wherein a token represents said source area comprising said one or more source ranges and said one or more source devices, and the method further comprises:
   sending a command request from a client to a data storage system, said command request including said token and other information identifying said target area and said offset; and
   responsive to receiving the command request at the data storage system, performing processing to translate the command request to the first request.

15. The method of claim 14, wherein the token is obtained by the client.

16. The method of claim 14, wherein the token is obtained by another component other than the client and then provided by the other component to the client.

17. The method of claim 7, wherein each of the plurality of other requests copies a different portion of the source data that is a first size, said first size being determined in accordance with said offset, said one or more source ranges, and said one or more target ranges, and wherein each of the plurality of other requests copies a different portion of the source data whereby said different portion is included in the source area and does not span across a boundary of any of the one or more source ranges and the different portion is copied to a corresponding location in the target area that does not span across a boundary of any of the one or more target ranges.

18. The method of claim 2, wherein the set of parameters is in accordance with a defined interface that is an application programming interface, and the first request is a call to invoke execution of code on a data storage system whereby said call is made using said defined interface, and wherein each of the one or more source ranges is expressed using a starting location on one of the one or more source devices and a length, and wherein each of the one or more target ranges is expressed using a starting location on one of the one or more target devices and a length.

19. A non-transitory computer readable medium comprising code stored thereon that, when executed, performs a method of copying data of a copy operation comprising:
   receiving, using a processor, a first request to perform a copy operation, said first request including a set of parameters including a source area and a target area, wherein said source area includes one or more source ranges and one or more source devices, wherein said target area includes one or more target ranges and one or more target devices, wherein the source area has a logical representation as a concatenation of said one or more source ranges;
   partitioning, using a processor, the first request into a plurality of other requests, each of the plurality of other requests being a request to copy a portion of source data located in the source area to a corresponding location in the target area;
   issuing, using a processor, the plurality of other requests that copy the source data from the source area to the target area; and
   reporting, using a processor, a first amount of the source data as copied to the target area at a point in time prior to completely copying the source data to the target area, wherein the first amount represents a size of a logically contiguous region of the source data at the point in time that has been copied from the source area to the target area in accordance with the logical representation of the source area, wherein, at the point in time of said reporting, said first amount reported does not include a size of a first portion of the source data that has been copied to the target area wherein the first portion has a location in the source area that is not logically contiguous with the logically contiguous region.

20. A system comprising:
   a host including first one or more processors and first code stored in a first memory, wherein said first code, when executed by the first one or more processors, issues a first request to a data storage system to perform a copy operation, said first request including a first set of parameters including a source area and a target area for the copy operation; and
   said data storage system including second one or more processors and second code stored in a second memory, wherein, said second code, when executed by the second one or more processors, performs processing comprising:

receiving the first request from the host;

translating the first request and associated first set of parameters into a second request and associated second set of parameters to perform the copy operation, wherein said second set of parameters is in accordance with a defined interface, said parameters of the second set including the source area and the target area, wherein said source area includes one or more source ranges and one or more source devices, wherein each of said one or more source ranges identifies a portion of a logical address range of a different one of the one or more source devices, wherein said target area includes one or more target ranges and one or more target devices, wherein each of said one or more target ranges identifies a portion of a logical address range of a different one of the one or more target devices, wherein the source area has a logical representation as a concatenation of said one or more source ranges;

partitioning the second request into a plurality of other requests, each of the plurality of other requests being a request to copy a portion of source data located in the source area to a corresponding location in the target area;

issuing the plurality of other requests that copy the source data from the source area to the target area; and reporting a first amount of the source data as copied to the target area at a point in time prior to completely copying the source data to the target area, wherein the first amount represents a size of a logically contiguous region of the source data at the point in time that has been copied from the source area to the target area in accordance with the logical representation of the source area, wherein, at the point in time of said reporting, said first amount reported does not include a size of a first portion of the source data that has been copied to the target area wherein the first portion has a location in the source area that is not logically contiguous with the logically contiguous region.

* * * * *